ROBERT J. GELIN &
TEREN K. SPROW
INVENTORS

Aug. 19, 1969    R. J. GELIN ET AL    3,462,081
SYSTEM FOR AIRLESS SPRAYING OF TWO LIQUIDS
Filed April 5, 1968    3 Sheets-Sheet 2

ROBERT J. GELIN &
TEREN K. SPROW
INVENTORS

BY
Staelin & Overman
ATTORNEYS

United States Patent Office 3,462,081
Patented Aug. 19, 1969

3,462,081
SYSTEM FOR AIRLESS SPRAYING OF TWO LIQUIDS
Robert J. Gelin and Teren K. Sprow, Newark, Ohio, assignors to Owens-Corning Fiberglas Corporation, a corporation of Delaware
Continuation-in-part of application Ser. No. 515,422, Dec. 21, 1965. This application Apr. 5, 1968, Ser. No. 719,216
Int. Cl. B05b 15/02, 7/04
U.S. Cl. 239—71                    12 Claims

ABSTRACT OF THE DISCLOSURE

A system is provided for the airless, and specifically hydraulic, atomization of a resin and a catalyst. The resin and the catalyst are precisely proportioned and yet supplied to a spray device at such pressures to achieve airless atomization of the resin and catalyst, which are combined just prior to being sprayed. The precise proportioning enables a minimum amount of the catalyst to be used and the elimination of the air atomization also results in a number of advantages, particularly in the utilization of a greater percentage of the coating materials.

---

This application is a continuation-in-part of a co-pending application of Robert J. Gelin, Ser. No. 515,422, filed Dec. 21, 1965, now Patent No. 3,409,222.

This invention relates to the spraying of two liquids and more particularly to a system for accurately proportioning two liquids and supplying them to a spray device under a pressure which is preferably sufficient to achieve airless, hydraulic atomization.

It has previously been common practice to employ a pressure pot system in spraying resin and catalyst. In this technique, separate containers of the resin and catalyst are maintained under air pressure and the resin and catalyst are then supplied to the spray device with the quantities controlled by flow meters. Not only has the system been less accurate than desirable, but frequent calibration is also required. In another technique, the catalyst is diluted with a diluent, or an accelerator sometimes is used with part of the resin and the catalyst is used with another part of the resin. In either case, the catalyst is used with additional material so that the proportioning ratio employed can be relatively low e.g. 3:1 instead of 100:1. In such a case, variations in the proportioning of five percent or more will not result in an unduly inaccurate amount of catalyst. However, in this system, the two proportions are mixed well upstream of the spray device in an attempt to obtain a thorough mixture of the mateials by the time they reach the surface being coated. The cleaning or flushing of the system results in quite a problem since the containers and lines requiring cleaning or flushing are substantial. A relatively short pot life of the materials also results, so that relatively small quantities of the mixture must be more frequently prepared to assure that they will be used within the proper time.

While airless atomization has been employed heretofore, it has not been used for spraying two liquids, and particularly a resin and a catalyst which must be supplied in a closely controlled proportion, with the amount of catalyst being very small as compared to the amount of resin. Further, the proportioning apparatus employed to control the proper ratio of the two liquids has not been entirely satisfactory, lacking precision due to changes in temperatures, pressures, etc. The proper and thorough mixing of the resin and catalyst also has not been completely achieved. Consequently, it has been the usual practice in the spraying of such liquids that the percentage of catalyst employed has been much higher than actually required. For example, where the proper ratio of resin to catalyst is 100:1, two to three percent of the catalyst actually will be employed to assure that all portions of the resin being sprayed will be cured. This may cause local areas of over-catalyzation and, in any event, substantially increases the cost of the materials because of the excess amount of the relatively costly catalyst. Further, by employing airless spraying with the elimination of atomizing air and concomitant overspray, the total amount of resin and catalyst required is significantly reduced.

The present invention provides a spraying system in which resin and catalyst are supplied separately and undiluted from their sources to the spray device through separate lines in which the amount of resin and catalyst is accurately controlled. Precise ratios of the resin and catalyst are thereby attained and it is no longer necessary to employ diluents or use excess amounts of the catalyst. Frequent calibration of the proportioning apparatus, which is sometimes beyond the capabilities of the operator, is no longer required and this also shortens the start up time for the system.

In the new spray system, the resin and the catalyst are maintained separately until reaching a point just prior to the spray device, with only a small portion of the system requiring flushing before hardening of the resin and catalyst can occur. The new spray system employs an automatic signal arrangement by means of which a signal is automatically effected if flushing does not take place within a predetermined period of time after spraying is stopped.

It is, therefore, a principal object of the invention to provide a spraying system for resin and catalyst having the advantages outlined above.

Other objects and advantages of the invention will be apparent from the following detailed description of preferred embodiments thereof, reference being made to the accompanying drawings, in which.

Figure 1:
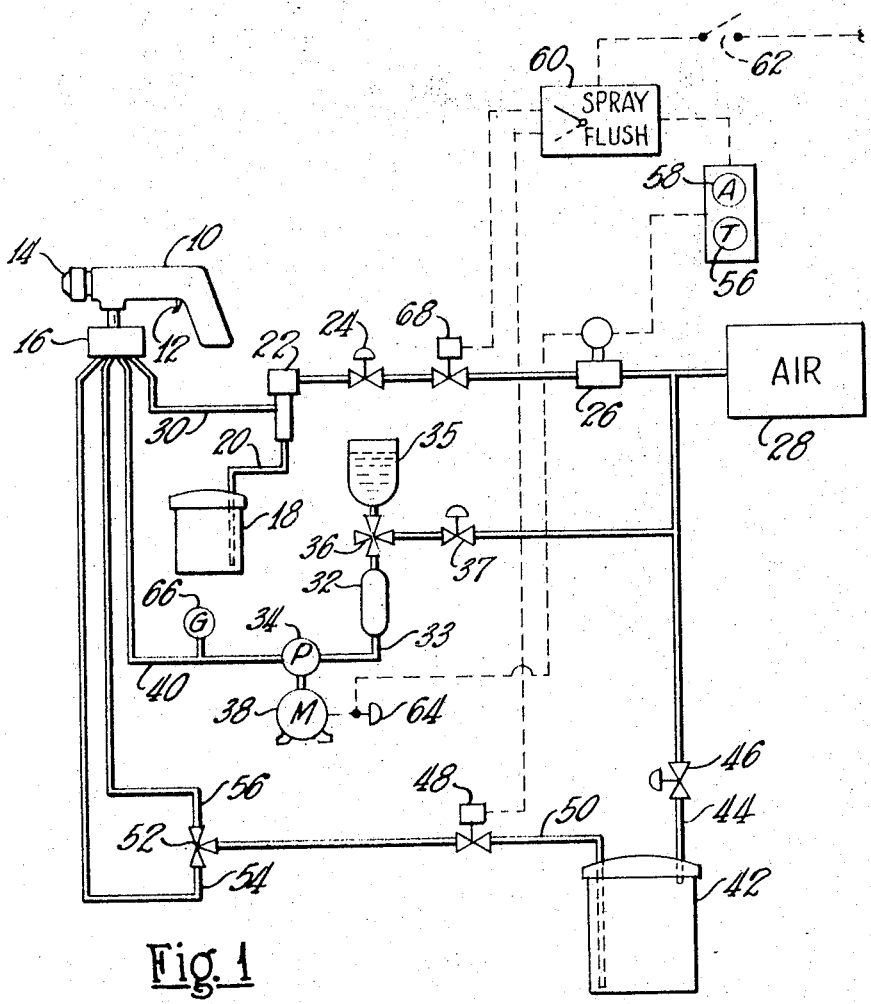
FIG. 1 is a diagrammatic view of an overall spraying system according to the invention, being of relatively simplified design and low cost.

Referring to the spraying system of FIG. 1, an airless spray gun 10 is shown in the system, although an air-atomized spray gun can be used if desired and an electrostatic technique can be employed to air in spraying or transporting of the liquids. The spray device or spray gun has a trigger 12 for opening and closing a valve in the spray gun to enable a nozzle 14 to communicate with a mixing head 16, which is disclosed in detail in a co-pending United States application to Gelin, Ser. No. 515,422. Resin is maintained in a container 18 at atmospheric pressure and is connected by a supply line 20 to a pump 22, which is air-operated and whose output is proportional to the pressure of the air supplied to the pump. Output will be affected to some extent by back pressure, however, which can vary according to such factors as the viscosity of the resin, the length of the supply line, and the size of the spray nozzle orifice. The pressure of the air supplied to the pump 22 is controlled by an adjustable controller or regulator 24 connected through a flow switch 26, the purpose of which will be discussed subsequently, to a source 28 of air. The resin from the pump 22 is then supplied at constant pressure through a line 30 to a resin-receiving portion of the mixing head 16.

Catalyst for the resin is supplied from a small pressurized container 32 through a line 33 to a positive displacement pump 34. The container 32 is filled from a reserve container 35 through a manual four-way valve 36 which also supplies air to pressurize the container 32 through a regulator 37. The pump 34, driven by a suitable motor 38, is of a commercially-available, single-acting type capable of providing an exact output which can be closely controlled by a simple adjustment of the piston stroke length. The catalyst is supplied from the pump 34 through a line 40 to a catalyst-receiving portion of the mixing head 16. With the pump 22 for the resin and the pump 36 for the catalyst, the ratio of the resin to catalyst can be closely controlled although the amount of resin will vary slightly, according to temperature. A variation in the amount of resin, however, is of minor consequence compared to a variation in the amount of the catalyst supplied. In systems heretofore employed, the catalyst has been subjected to a larger percentage variation than the resin.

The mixing head 16 thoroughly mixes the resin and catalyst, even with the higher ratios involved, the mixture then being supplied to the spray device 10 and the nozzle 14. Because the resin and catalyst are mixed, however, from the mixing head 16 on, thorough flushing of the head and the spray device is essential when spraying is finished. For this purpose, solvent is supplied from a container 42 which is under pressure by virtue of a line 44 connected through a regulator 46 to the air source 28. When a solenoid-operated valve 48 is opened, the solvent is supplied through a line 50 to a three-way valve 52 which is manually operated to selectively supply the solvent through a line 54 to flush the resin-receiving portion of the mixing head 16 or through a line 56 to flush the catalyst-receiving portion of the mixing head 16. In this way, positive flushing is assured for each part of the mixing head. Otherwise, if one of the resin or catalyst lines in the mixing head were partially obstructed, the solvent would tend to flow through the other line and not clear the partially plugged one.

It is essential that thorough flushing be achieved shortly after spraying is stopped since the work involved in cleaning the system and opening the passages in the event the catalyzed resin should harden is tremendous. Consequently, means are provided in the system to effect a signal and, specifically, to sound an alarm, in the event that flushing is not accomplished within a predetermined period after spraying has stopped. For this purpose, a timer 56 is energized by the flow switch 26 when spraying begins and air flows from the source 28 to the pump 22. When spraying has stopped, and flow has stopped, the timer 56 begins timing out, by way of example, for a period of thirty to ninety seconds, after which it causes a signal or alarm 58 to be actuated. The signal can be in the form of a buzzer or light and immediately indicates to the operator that flushing has not been begun and should be. If a control switch 60 is moved from a spray position designated Spray to a flush position designated Flush prior to the timer 56 timing out, then power to the timer and the signal is cut off and the alarm will not sound. Otherwise, the signal 58 continues to operate until the power thereto is shut off.

In the operation of the system, after a main switch 62 is closed, a push button 64 is actuated to operate the pump 34 until the catalyst pressure, as measured on a gauge 66, reaches a desired amount. When the proper pressure is reached, the gun trigger 12 is depressed and the catalyst and resin will be supplied to the gun, a solenoid-operated valve 68 between the air source 28 and the pump 22 having been energized and opened when the switch 60 was placed at the Spray position and the main switch 62 was closed. The pump 36 will then be operated whenever resin is supplied to the spray gun and air is supplied to the pump 22 so that the flow switch 26 is closed, by-passing the push button 64 and energizing the pump motor 38. Thus, the pump 34 will pump catalyst when air flows to the resin pump 22.

After spraying is completed and the switch 60 is moved to the Flush position, the solenoid valve 48 will be operated to enable flushing to proceed through the three-way valve 52, and the valve 68 will close. Of course, each time the trigger 12 is released and spraying is stopped, the flow switch 26 will cause the timer 56 to begin to time out and the pump motor 38 will be stopped until spraying is commenced once again. If spraying is stopped completely before the timer 56 actuates the signal 58, spraying can still be commenced again, at which time the flow switch 26 will reset the timer 56 as long as the switch 60 is in the Spray position.

Figure 2:
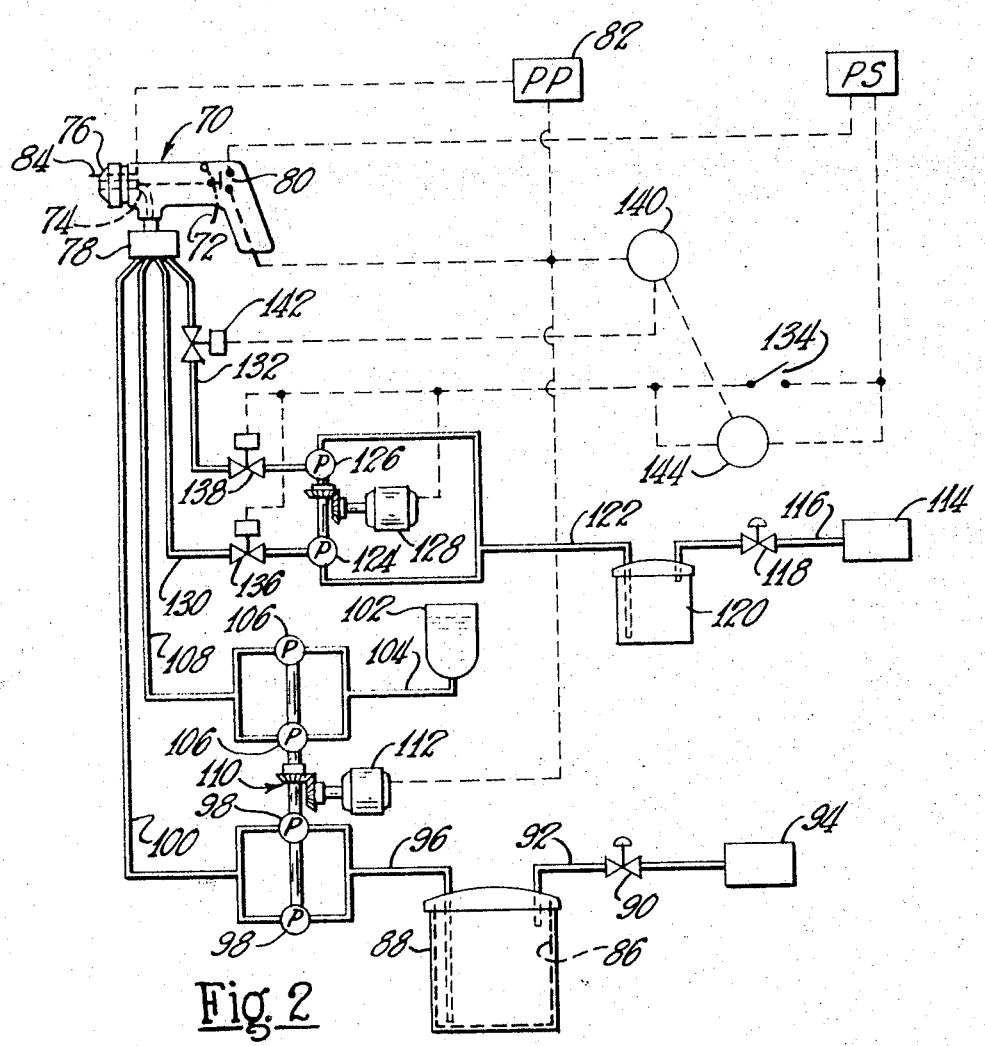
FIG. 2 is a diagrammatic view similar to FIG. 1 of a modified spraying system, which is somewhat more complex, having more precise controls.

A modified embodiment of the spraying system is shown in FIG. 2. This embodiment is somewhat more sophisticated, employing a more precise pump to control the resin supply and also incorporating more controls and safety devices. This system is shown used with an electrostatic, airless spray gun but is not limited to such use. Accordingly, a spray gun or device 70 includes a trigger 72 for opening and closing a valve in the gun 70, schematically shown at 74. When the valve is opened, a nozzle or end cap 76 communicates with a mixing head 78 which can be similar to the mixing head 16 of FIG. 1 and similar to that shown in the aforementioned Gelin application, Ser. No. 515,422. The trigger 72 also is effective to operate a switch 80 which connects a power pack 82 to an electrode 84 located adjacent the nozzle 14 to impart a charge to particles sprayed from the nozzle. The switch 80 also is effective to operate other controls which will be discussed subsequently.

Resin to be supplied to the spray gun 70 is maintained under pressure, in this instance, in a container 86 located within a pressure vessel 88. Air is supplied to the vessel 88 through a pressure regulator 90 and a line 92 from a suitable air source 94. The resin from the container 86 is then supplied through a line 96 to a pair of positive displacement pumps 98 which are equipped with suitable safety provisions for limiting maximum output pressure. The resin is supplied from the pumps 98 to the mixing head 78 through a supply line 100. The pumps 98 are single-acting and are similar but of larger capacity than the pump 36 of FIG. 1. By employing two of the pumps 98 with their pulses alternating, a smoother flow of resin is provided for the spray device 70. As is true of the pump 36, the pumps 98 provide an exact output which can be closely controlled by a relatively simple adjustment of the length of the piston stroke.

Catalyst for the spray gun 70 can be supplied from a small container 102 by gravity through a line 104 to additional positive displacement pumps 106 which are the same type as the pumps 98 but are of a smaller capacity, similar to the pump 36. From the pumps, the catalyst is directed to the mixing head 78 through a line 108.

The two pairs of pumps 98 and 106 should be driven at the same speed to maintain the precise ratio of resin to catalyst. To achieve this, the four pumps can be connected through a common drive shaft to a gear train schematically shown at 110 and driven by a single motor 112. In this manner, synchronization of the pumps is assured and the desired high ratios of resin to catalyst are maintained without requiring frequent calibration.

For flushing the system, in place of the single solvent source and the three-way valve 52 of FIG. 1, two separate systems are provided. Accordingly, a source 114 of air applies pressure through a line 116 and a pressure regulator 118 to a pressure pot or container 120 for solvent or flushing liquid. The solvent is supplied through a line 122 to two separate pumps 124 and 126 which can be driven by a single motor 128 but feed solvent separately through separate lines 130 and 132 to the resin and catalyst passages of the mixing head 78.

A manually operated flush switch 134 is closed after spraying is terminated to energize solenoid valves 136 and 138 to open the flush lines 130 and 132. At the same time, the motor 128 for the pumps 124 and 126 is started so that the flushing liquid or solvent can be supplied to the head 78 and the spray gun 70.

An interval timer 140 is connected with the switch 80 and is caused to begin to time out when the switch is closed and then opened, as when the trigger 72 is pulled to begin spraying and is then released to stop spraying. The timer 140 can be reset by a pressure switch 142 located in one of the flush lines 130 and 132 which is operated when there is flow of liquid in that line. If, during the period of timing out, the manual switch 134 is closed to flush the system, the timer will be reset and not effect an electrical signal. The timer 140 will then remain dormant and not begin to time out again until the spray gun trigger 72 is subsequently pulled and released once again. If the manual switch 134 is not closed in the period set for the timer 140, the electrical signal effected by the timer 140 energizes a duration timer 144 which completes a by-pass circuit around the switch 134 and causes flushing to take place for a predetermined period as set by the timer 144.

Figure 3:
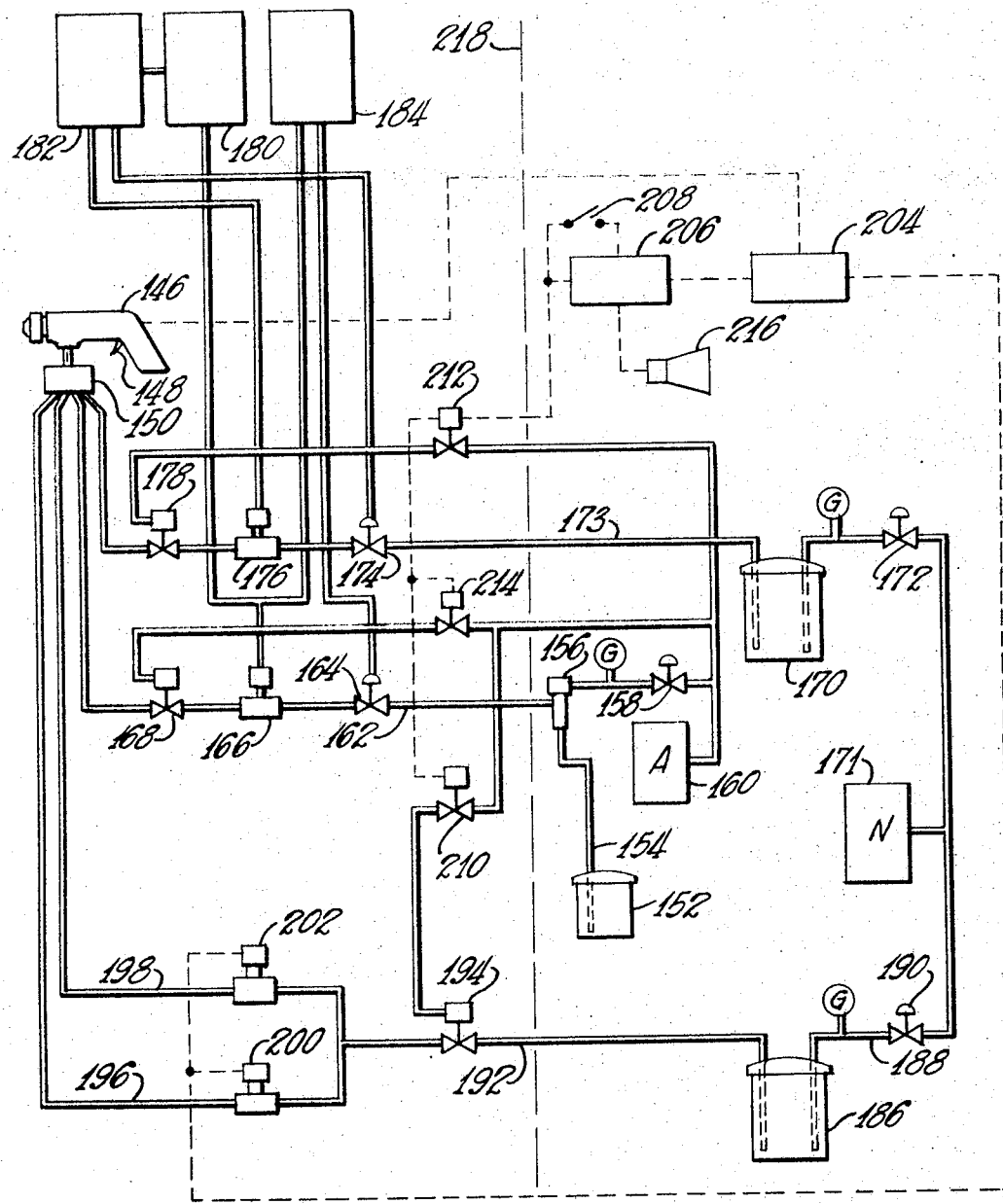
FIG. 3 is a diagrammatic view of a further modified spraying system which is particularly suitable for use with a plurality of spray devices.

The spray system shown in FIG. 3 is even more accurate, although more costly, than the systems of FIGS. 1 and 2. The system of FIG. 3, however, is particularly adaptable for a multi-spray gun arrangement which enables common components, in a number of instances, to be used for all the spray guns, thereby decreasing the cost per spray gun. A suitable spray device or spray gun 146 has a trigger 148 for opening and closing a valve of the gun and also for operating any electrostatic equipment for the gun. A mixing head 150, similar to the mixing head 78, is employed to mix thoroughly and uniformly the resin and catalyst supplied thereto, prior to entering the spray gun.

A supply of resin for the spray gun 146 is at atmospheric pressure in a container 152. The resin supply is connected by a line 154 to a pump 156 which can be similar to the pump 22 of FIG. 1, being air operated with the output substantially proportional to the pressure of the air supplied to the pump. This air pressure is controlled by a pressure regulator 158 connected to a source 160 of air. The resin from the pump 156 is supplied at constant pressure to the mixing head 150 through a line 162 containing a flow control valve 164, a flow transmitter 166, and an air-operated valve 168, which will be discussed subsequently.

Catalyst for the system is supplied directly from a pressure pot or container 170, in this instance, an accurate pump not being necessary because of the proportioning control which is employed. Gas pressure for the container 170 is supplied from a source 171 through a regulator 172. An inert gas such as nitrogen can be used for this purpose. The catalyst is supplied to the mixing head 150 through a line 173 containing a flow control valve 174, a flow transmitter 176, and an air-operated valve 178.

For controlling the proportion of resin to catalyst, a catalyst ratio controller 180 and a catalyst receiver controller indicator 182 are employed. A resin indicator controller 184 also is employed if the resin or gel coat output is to be maintained at a predetermined rate. A signal from the resin flow transmitter 166 is transmitted to the catalyst ratio controller 180 which is coupled to the catalyst receiver controller indicator 182. The indicator 182 also receives a signal from the catalyst flow transmitter 176. The indicator 182 is responsive to both the desired resin-catalyst ratio which is manually set by the operator on the controller 180 and the actual catalyst rate from the transmitter 176. The indicator 182 then sends a signal to the catalyst flow control valve 174 to provide the required flow rate to maintain the desired ratio.

When close control over the individual resin or gel coat output is desired, the flow control valve 164 and the controller 184 are employed, with the controller 184 being responsive to a signal from the flow transmitter 166 as well as a signal representing the desired resin flow rate as is manually set on the controller 184. The controller 184 then sends a signal to the flow control valve 164 to maintain the resin flow rate at the desired amount.

Again, thorough flushing is required for the mixing head 150 and the spray gun 146. Flushing liquid or solvent is supplied from a pressure pot or container 186 supplied with gas through a line 188 from the source 171, with the pressure being controlled by a pressure regulator 190. The solvent is supplied through a line 192 containing an air-operated valve 194 and is then directed through separate lines 196 and 198 to the resin-receiving and catalyst-receiving portions of the mixing head. Each of the lines 196 and 198 contains a pressure or flow switch 200 or 202 responsive to the flow of solvent therethrough. In the event one of the passages should tend to be plugged and the flow of solvent is slowed down or stopped, then the flow switch will sense this and cause an alarm to be sounded as if no flushing took place at all, as will be discussed subsequently. An interval timer 204 and a duration timer 206 are again provided for the system of FIG. 3 with the interval timer operated in the same manner as in FIG. 2. Accordingly, when the trigger 148 of the spray gun 146 is pulled to begin spraying and is subsequently released to stop spraying, the timer 204 then begins to time out. If a switch 208 is closed during this period, it will energize a solenoid 210 which will enable air to be supplied to the air-operated valve 194 causing the valve to open and solvent to flow to the spray head. The flow will be sensed by the flow responsive switches 200 and 202 and cause the interval timer 204 to reset. At the same time that the valve 194 is opened, the air-operated valves 168 and 178 are caused to be closed to assure that resin and catalyst are off during flushing. Accordingly, the closing of the switch 208 also energizes solenoid valves 212 and 214 which causes the air to flow to the valves 168 and 178 in a manner to cause them to close in this instance, the valves otherwise being urged toward the open positions. If the flushing does not begin before the timer 204 times out, the duration timer 206 is energized by an electrical signal from the timer 204 to by-pass the switch 208 and cause flushing to take place. At the same time, the timer 206 energizes an audible alarm 216.

With this system, the components to the right of a dotted line indicated at 218 can be used for several spray guns to reduce the cost per gun while the components to the left of the line 218 are employed for each of the guns.

The various components of the third system are all commercially-available devices. The flow transmitters 166 and 176 can be Foxboro No. 13HA instruments. The catalyst ratio controller 180 can be a Foxboro No. 52A–IZS instrument; the catalyst receiver controller indicator 182 can be a Foxboro No. 52A–SP4 instrument; and the resin indicator and controller 184 can be a Foxboro No. 52A–2R instrument.

Various modifications of the above-described embodiments of the invention will be apparent to those skilled in the art, and it is to be understood that such modifications can be made without departing from the scope of the invention.

We claim:
1. A spray system for spraying a combination of two liquids, said system including a spray gun, a mixing head communicating with said spray gun, a source of a first liquid, means for supplying the first liquid from said liquid source to said mixing head, a source of a second liquid, means for supplying the second liquid from said second liquid source to said mixing head, means for flushing said mixing head and said spray gun after the spray from the spray gun is shut off, said flushing means including a source of flushing liquid, means for supplying flushing liquid from said liquid source to the first liquid-receiving portion of the mixing head, means for supplying flushing liquid from said source to the second liquid-receiving portion of said mixing head, manually controlled valve means for controlling supply of flushing liquid by both of said flushing liquid supply means from said flushing liquid source to the first liquid-receiving portion and to the second liquid-receiving portion of said mixing head, and timing means for producing a signal in the event initiation of flushing of said mixing head and said spray gun does not occur within a predetermined period of time after spraying is stopped.

2. A spray system according to claim 1 characterized further by means for rendering said timing means ineffective in the event said manually-controlled valve means causes liquid to be supplied to the mixing head within said predetermined period.

3. A system according to claim 2 characterized by said ineffective-rendering means comprises a manually-operated switch for selectively spraying and flushing the system which renders said timing means ineffective when moved from a spraying position to a flushing position.

4. A system according to claim 2 characterized by said ineffective-rendering means comprises a flow responsive device associated with one of said flushing liquid supply means.

5. A system according to claim 1 characterized further by additional timing means actuated by the signal from said timing means and effective to cause flushing liquid to be supplied by said supply means for a second predetermined period after the expiration of the first predetermined period set for said timing means.

6. A spray system for spraying a combination of liquids, said system including a spray gun, a mixing head communicating with said spray gun, a first air-operated pump whose output is proportional to the air supplied to drive the pump, means for supplying air to said pump, a source of first liquid, means for supplying the first liquid from said source to said pump, means for supplying the first liquid from said pump to said mixing head, a second, positive displacement pump, a motor for driving said second pump, a source of a second liquid, means for supplying the second liquid from said second liquid source to said second pump, means for supplying the second liquid from said second pump to said mixing head, said mixing head having means for mixing together the first and second liquids, means for supplying flushing liquid to said mixing head after the spray from the spray gun is shut off, and manually operated means for causing said positive displacement pump to be initially actuated independently of said air-driven pump.

7. A spray system for spraying catalyzed resin, said system including at least one spray gun, at least one mixing head communicating with said spray gun, a source of resin, means for supplying resin from said source to said mixing head, a flow transmitter located between said source and said mixing head, a source of catalyst, means for supplying catalyst from said catalyst source to said mixing head, a catalyst flow transmitter located between said catalyst source and said mixing head, a catalyst flow control valve in series with said catalyst flow transmitter, a catalyst ratio controller connected with said resin flow transmitter, a catalyst receiver controller indicator connected with said catalyst flow transmitter to receive a signal therefrom and connected with said catalyst ratio controller, said indicator also controlling said catalyst flow control valve to provide the desired flow rate and to maintain the desired ratio of resin to catalyst.

8. A spray system according to claim 7 characterized further by a resin flow control valve between said resin source and said mixing head, a resin indicator controller connected with said resin flow transmitter, and with said resin flow control valve to maintain the flow of resin at a desired rate.

9. A spray system according to claim 7 characterized by a source of flushing liquid, means connecting said liquid source with the catalyst receiving portion of said mixing head, means for connecting said source with the resin receiving portion of said mixing head, and a flow responsive switch associated with each of said last-named connecting means and effective to operate a signal in the event that flow of flushing liquid through the respective connecting means is less than a predetermined amount.

10. A spray system for spraying a combination of two liquids, said system including a spray gun, a mixing head communicating with said spray gun, a first pump, means for driving said pump, a source of a first liquid, means for supplying the first liquid from said source to said pump, means for supplying the first liquid from said pump to said mixing head, a second pump, means for driving said second pump, a source of a second liquid, means for supplying the second liquid from said second liquid source to said second pump, means for supplying the second liquid from said second pump to said mixing head, said mixing head having means for mixing together said first and second liquids, a source of flushing liquid, a three-way valve, means connecting said flushing liquid source and said three-way valve, means connecting said three-way valve to the first liquid-receiving portion of said mixing head, separate means connecting said three-way valve to the second liquid-receiving portion of said mixing head, and valve means between said flushing liquid source and said three-way valve for controlling the flow of flushing liquid to said three-way valve from said flushing liquid source.

11. A spray system for spraying a combination of liquids, said system including a spray gun, a mixing head communicating with said spray gun, a first air-operated pump whose output is proportional to the air supplied to drive the pump, means for supplying air to said pump, a source of a first liquid, means for supplying the first liquid from said source to said pump, means for supplying the first liquid from said pump to said mixing head, a second, positive displacement pump, a motor for driving said second pump, a source of a second liquid, means for supplying the second liquid from said second liquid source to said second pump, means for supplying the second liquid from said second pump to said mixing head, said mixing head having means for mixing together said first and second liquids, means for supplying flushing liquid to said mixing head after the spray from the spray gun is shut off, said flushing liquid supply means comprising a source of flushing liquid, a three-way valve, means connecting said flushing liquid source and said three-way valve, means connecting said three-way valve to the first liquid receiving portion of said mixing head, separate means connecting said three-way valve to the second liquid-receiving portion of said mixing head, valve means between said flushing liquid source and said three-way valve for controlling the flow of flushing liquid to said three-way valve from said source, said valve means between said three-way valve and said flushing liquid source being electrically operated, an additional electrically-operated valve between said air-driven pump and said air source, a manually controlled switch connected with said additional electrically-operated valve and with said motor for said positive displacement pump for opening said additional electrically-operated valve and for driving said motor, and at the same time closing said first electrically-operated valve, and also for opening said first valve while closing said additional valve and stopping said motor, to alternately cause said system to spray and to be flushed.

12. A system according to claim 11 characterized further by a timer which times out when spraying is stopped, a flow sensitive switch between said air source and said air-operated pump, and means connecting said timer and said flow sensitive switch to cause said timer to begin to time out when spraying is stopped, said timer also being connected to said manually operable switch to cause said timer to reset when said manually operable switch is moved from a spray position to a flush position.

(References on following page)

References Cited

UNITED STATES PATENTS

| | | | |
|---|---|---|---|
| 2,885,268 | 5/1959 | Breer et al. | 239—428 |
| 2,890,836 | 6/1959 | Gusmer et al. | 239—428 |
| 2,894,732 | 7/1959 | Taber et al. | 239—428 |
| 2,970,773 | 2/1961 | Keryluk et al. | 239—428 |
| 3,049,439 | 8/1962 | Coffman | 239—428 |
| 3,179,341 | 4/1965 | Plos et al. | 239—428 |
| 3,251,508 | 5/1966 | Borys | 239—335 |
| 3,341,128 | 9/1867 | Nagin et al. | 239—335 |
| 3,403,695 | 10/1968 | Hopkins | 239—335 |
| 3,083,913 | 4/1963 | Coffman et al. | 239—142 X |
| 3,122,322 | 2/1964 | Niemann et al. | 239—142 X |
| 3,123,306 | 3/1964 | Bradley | 239—142 |
| 3,146,950 | 9/1964 | Lancaster | 239—112 X |

EVERETT W. KIRBY, Primary Examiner

U.S. Cl. X.R.

239—112, 336